United States Patent [19]
Itoh

[11] Patent Number: 5,333,446
[45] Date of Patent: Aug. 2, 1994

[54] DIAGNOSTIC SYSTEM FOR A SECONDARY AIR SUPPLIER IN AN ENGINE

[75] Inventor: Tokiji Itoh, Toyota, Japan

[73] Assignee: Toyota Jidosha Kabushiki Kaisha, Toyota, Japan

[21] Appl. No.: 40,816

[22] Filed: Mar. 31, 1993

[30] Foreign Application Priority Data

Apr. 14, 1992 [JP] Japan .................................. 4-094490
May 15, 1992 [JP] Japan .................................. 4-123968

[51] Int. Cl.$^5$ .............................................. F01N 3/20
[52] U.S. Cl. ........................................ 60/274; 60/276; 60/277; 60/289
[58] Field of Search ................... 60/274, 276, 277, 289

[56] References Cited

U.S. PATENT DOCUMENTS 5,060,474 10/1991 Aramaki .................................. 60/277
5,113,651 5/1992 Kotzan .................................... 60/274
5,119,631 6/1992 Kayanuma et al. ..................... 60/274
5,140,810 8/1992 Kuroda ................................... 60/274

FOREIGN PATENT DOCUMENTS 63-111256 5/1988 Japan .

OTHER PUBLICATIONS

Toyota Technology Publication No: 2801, pp. 1 and 2, published Oct. 28, 1988.

Primary Examiner—Douglas Hart
Attorney, Agent, or Firm—Kenyon & Kenyon

[57] ABSTRACT

A secondary air supplier supplies secondary air to an exhaust passage, when an engine is in a predetermined condition. An oxygen sensor detects the air-fuel ratio (A/F) in the exhaust gas. The air-fuel ratio indicates either a rich condition or a lean condition. When the engine is cold, a time counter measures a lean period of time, while secondary air is supplied. When the lean period exceeds a predetermined period of time, a diagnostic system determines that the secondary air supplier is functioning properly. If the oxygen sensor detects that the ratio (A/F) indicates a rich condition during the diagnosis, then the time counter stops measuring the lean period, with keeping the total measured lean period. When the engine is hot, the ratio of the lean period to a predetermined period for the secondary air supply could be smaller than a predetermined ratio, and the diagnostic system determines that the air supplier is malfunctioning.

17 Claims, 11 Drawing Sheets

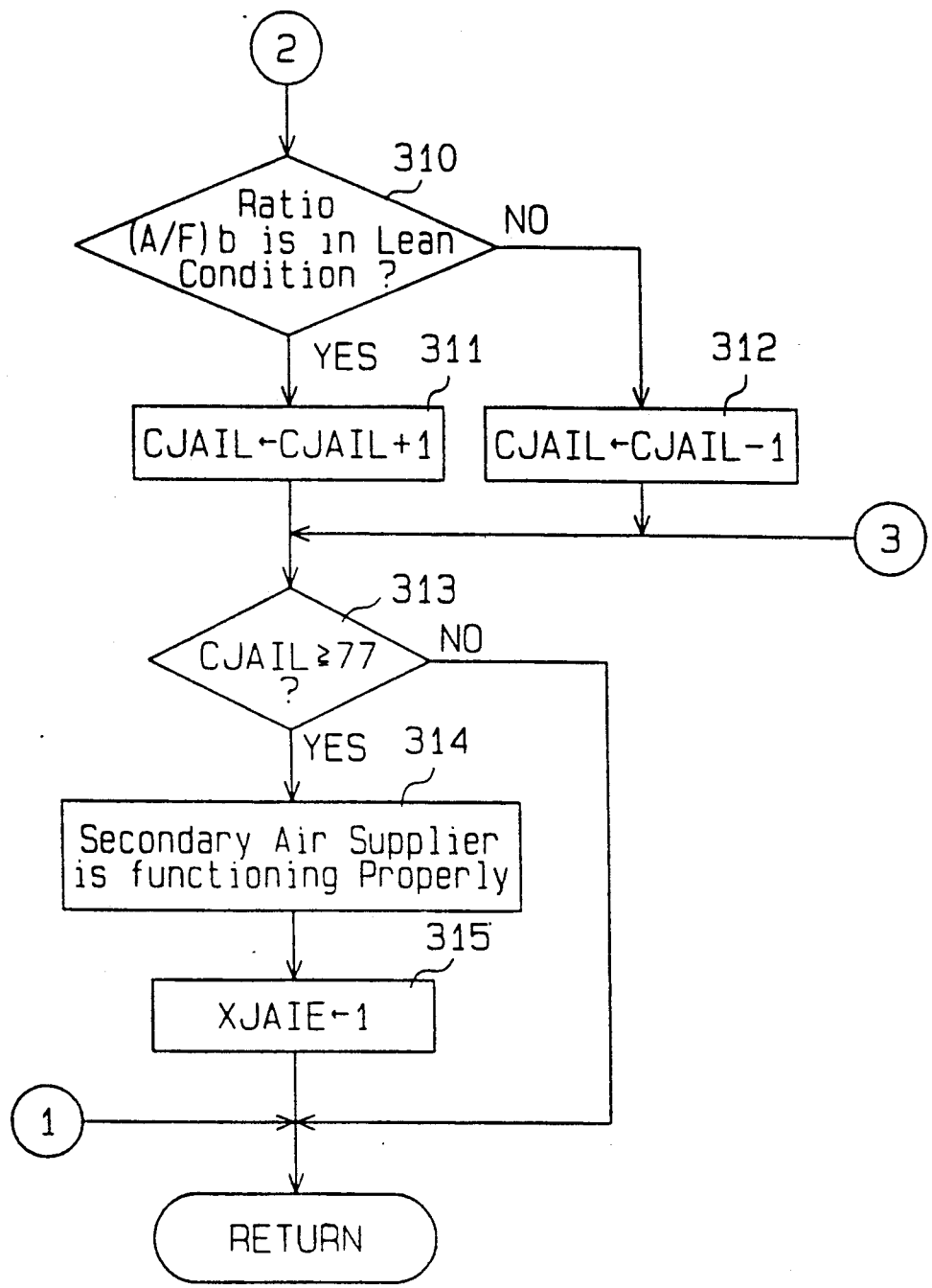

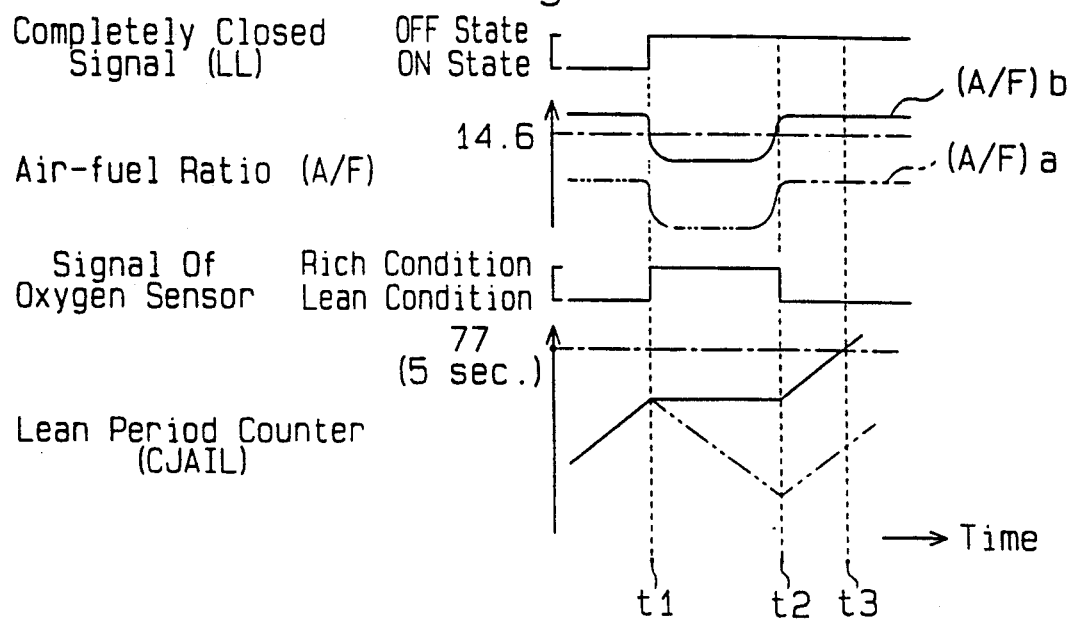
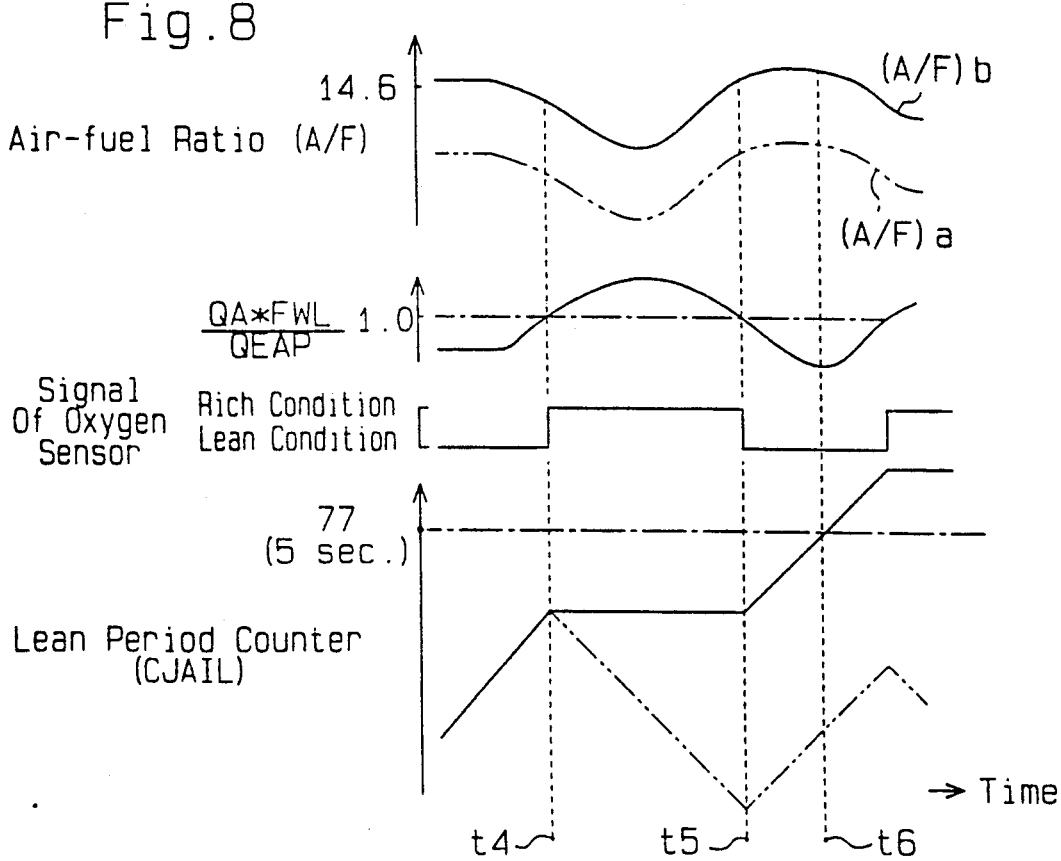

DIAGNOSTIC SYSTEM FOR A SECONDARY AIR SUPPLIER IN AN ENGINE

BACKGROUND OF THE INVENTION

1. Field of the Invention

The present invention generally relates to a secondary air supplier for use in a vehicle. More particularly, the present invention pertains to a diagnostic system for diagnosing the condition of the secondary air supplier. The air supplier supplies secondary air to an exhaust passage of the engine, in order to purify the exhaust gas.

2. Description of the Related Art·

Conventional exhaust gas purification techniques generally utilize an oxygen sensor and a three way catalytic converter, in order to satisfy two requirements. The first requirement is to clear the legalistic regulation, and the other requirement is to minimize the engine fuel consumption. These conventional techniques include oxidizing and/or deoxidizing the carbon monoxide (CO), hydro-carbon (HC) and nitrogen oxides (NOx), contained in the exhaust gas, in order to purify it. In order to efficiently complete these reactions, the air-fuel ratio in the engine should maintained at about a theoretical air-fuel ratio. The concept for maintaining the theoretical air-fuel ratio has been embodied in several engine systems.

An exemplary engine system of this type includes an engine control unit, an oxygen sensor disposed along an exhaust passage, and a secondary air supplier for directly supplying the secondary air from an intake passage to the exhaust passage. The control unit calculates the air-fuel ratio (A/F) of the air-fuel mixture in the engine cylinders, based on the output signal from the oxygen sensor. Further, the control unit executes a closed loop control operation (i.e., feedback control operation) for controlling the supplied amount of air and/or fuel. As a result of this control, the air-fuel ratio becomes closer to the theoretical air-fuel ratio.

When the engine is operating under specific conditions, the secondary air is supplied to the exhaust passage by means of the secondary air supplier, in order to prevent air-fuel ratio to be fuel-rich condition, and to minimize the generation of hydrocarbon.

The following are illustrative specific operation conditions of the engine: the coolant temperature is still cold; and the vehicle is decelerating. The control unit executes an open loop control operation for the air-fuel ratio (A/F), while the secondary air is being supplied. The control unit re-executes the closed loop control operation for the air-fuel ratio, simultaneously with the termination of the secondary air supply.

In this conventional engine system, the exhaust emission could become faulty, when the secondary air supplier malfunctions. TOYOTA technology publication No. 2801 (published on Oct. 28, 1988) proposed a diagnostic system for diagnosing whether or not the secondary air supplier is functioning properly.

A conventional secondary air supplier temporarily supplies the secondary air to the exhaust passage, even when the secondary air should not be supplied to the exhaust passage. If the secondary air supplier is properly functioning, the oxygen sensor should transmit a signal which indicates the air-fuel ratio (A/F) is "lean", that is the air content is greater then the fuel content. If the oxygen sensor does not transmit a signal indicative of the lean condition of the air-fuel ratio, the secondary air supplier might not function properly. Therefore, in this case, the conventional diagnostic system determines that the secondary air supplier is malfunctioning.

The Japanese Unexamined Patent Publication No. 63-111256 discloses another system for diagnosing the secondary air supplier. When the oxygen sensor is transmitting a signal, which indicates the air-fuel ratio (A/F) is rich condition, that is the fuel content is greater than the air content, under specific engine conditions under which the secondary air should be supplied, the diagnostic system determines that the secondary air supplier is malfunctioning.

However, both conventional diagnostic systems might sometime determine that the secondary air supplier is malfunctioning, even when the oxygen sensor transmits a signal indicative of the rich condition of the air-fuel ratio (A/F), in response to the temporarily rich condition of the air-fuel ratio. Some examples of misdiagnosis will now be described.

The output signal transmitted from the oxygen sensor has characteristic of: radical change of signal state being made around the specific point of A/F (i.e., 14.6). Therefore, even when the air-fuel ratio temporarily becomes "14.5" (this value indicates that the air-fuel ratio is slightly rich), the diagnostic system thus determines that the air-fuel ratio is positively rich (i.e., the supplier is malfunctioning).

The exhaust gas discharged from the engine cylinders is mixed within the exhaust passage. Only one oxygen sensor determines the air-fuel ratio (A/F) in the exhaust gas. Therefore, when the air-fuel ratio of the exhaust gas discharged from the cylinders are differed, the oxygen sensor could give a fault indication, based on the exhaust gas discharged from a particular.

In other words, even when the mean value of the air-fuel ratio in the exhaust gas discharged from all cylinders, is lean, if the oxygen sensor detects a rich air-fuel ratio is in the rich condition, the diagnostic system then determines that the supplier is malfunctioning.

If the air-fuel ratio of the mixture in the combustion chambers is extremely rich, the air-fuel ratio of the exhaust gas could remain rich, even if secondary air is supplied to the exhaust gas. This condition could occur in any one of following conditions: (1) an additional amount of injected fuel is excessively large when the engine is still cold; (2) immediately after the simultaneous injection of fuel is executed; or (3) immediately after the vehicle starts decelerating.

Further, when the amount of exhaust gas is too large with respect to that of the secondary air, the air-fuel ratio (A/F) of the exhaust gas could become rich. Even under those conditions, the diagnostic system executes the diagnostic operation, only based on a signal transmitted from the oxygen sensor. Therefore, even when the secondary air supplier is functioning properly, the diagnostic system determines that the supplier is malfunctioning.

Furthermore, the oxygen sensor tends to transmit a signal indicative of the lean condition, when its sensing element is cold. As a result, even if the air-fuel ratio (A/F) is actually rich, the diagnostic system could determine that the air-fuel ratio (A/F) is lean, due to the cold element temperature of the sensing element. In such a case, the secondary air supplier should be diagnosed as malfunctioning, but the diagnostic system determines that the supplier is functioning properly.

The conventional diagnostic system determines whether or not the supplier is functioning properly, only based on the signal output from the oxygen sensor. Therefore, the conventional diagnostic system could misdiagnose the condition of the secondary air supplier, as described above.

SUMMARY OF THE INVENTION

Accordingly, it is a primary object of the present invention to provide a diagnostic system for a secondary air supplier, which accurately diagnoses the condition of the secondary air supplier, even when the air-fuel ratio temporarily changes. To achieve the foregoing and other objects, and in accordance with the purpose of the present invention, an improved diagnostic system is provided for use in an engine secondary air supplier.

The engine includes an intake passage and an exhaust passage. The secondary air supplier includes a supply unit for supplying air from the intake passage to the exhaust passage, a detector unit for detecting the condition of the engine, and a control unit for controlling the supply unit in accordance with the engine condition. The improved diagnostic system includes a con, hand unit, a first detector, a second detector, a measuring unit, and a diagnostic unit for determining which condition is the secondary air supplier.

The command unit commands the secondary air supplier to supply air to the exhaust passage for a predetermined period of time, in order to diagnose the secondary air supplier. The first detector detects the air-fuel ratio (A/F) of the exhaust gas within the exhaust passage. The second detector detects whether the air-fuel ratio is lean, that is if this ratio is greater than a theoretical air-fuel ratio.

The measuring unit measures a lean period during which the second detector detects the lean condition, while the secondary air supplier supplies air in response to a request from the command unit. The diagnostic unit determines that the air supplier is malfunctioning, when the ratio of the lean period to the predetermined period of time is smaller than a predetermined ratio.

BRIEF DESCRIPTION OF THE DRAWINGS

The features of the present invention that are believed to be novel are set forth with particularity in the appended claims. The invention, together with the objects and advantages thereof, may best be understood by reference to the following description of the preferred embodiments, together with the accompanying drawings, in which FIGS. 1 through 11 illustrate a first embodiment according to the present invention, for use in a vehicle:

FIG. 1 is a schematic top plan view illustrating a vehicle engine system including a secondary air supplier;

FIG. 2 is a block diagram illustrating an electronic control unit (ECU) and its peripheral devices for use in a vehicle;

FIG. 3 is a graph illustrating the relationship between time and each of the following factors: output voltage (Vd) from a oxygen sensor; and a feedback correction factor;

FIG. 4 is a flowchart illustrating a main diagnostic routine executed by a central processing unit (CPU) forming part of the ECU;

FIGS. 5 and 6 are flowcharts illustrating a diagnostic sub-routine for use when the engine is cold;

FIG. 7 is a timing chart illustrating the relationship between time and each one of the following factors: completely closed signal (LL); air-fuel ratio (A/F); oxygen sensor signal; and lean period counter (CJAIL);

FIG. 8 is a timing chart illustrating the relationship between time and each of the following factors: air-fuel ratio (A/F); exhaust air-fuel ratio; oxygen sensor signal; and lean period counter (CJAIL);

FIGS. 9 and 10 are flowcharts illustrating a diagnostic sub-routine for use when the engine is warm;

FIG. 11 is a timing chart illustrating the relationship between time and each of the following factors: operational condition of an air pump; feedback correction factor (FAF); oxygen sensor signal; diagnosis completion flag (XJAIE); diagnosis execution counter (CJAI); and lean period counter (CJAIL)

DETAILED DESCRIPTION OF THE PREFERRED EMBODIMENT

Figure 1:
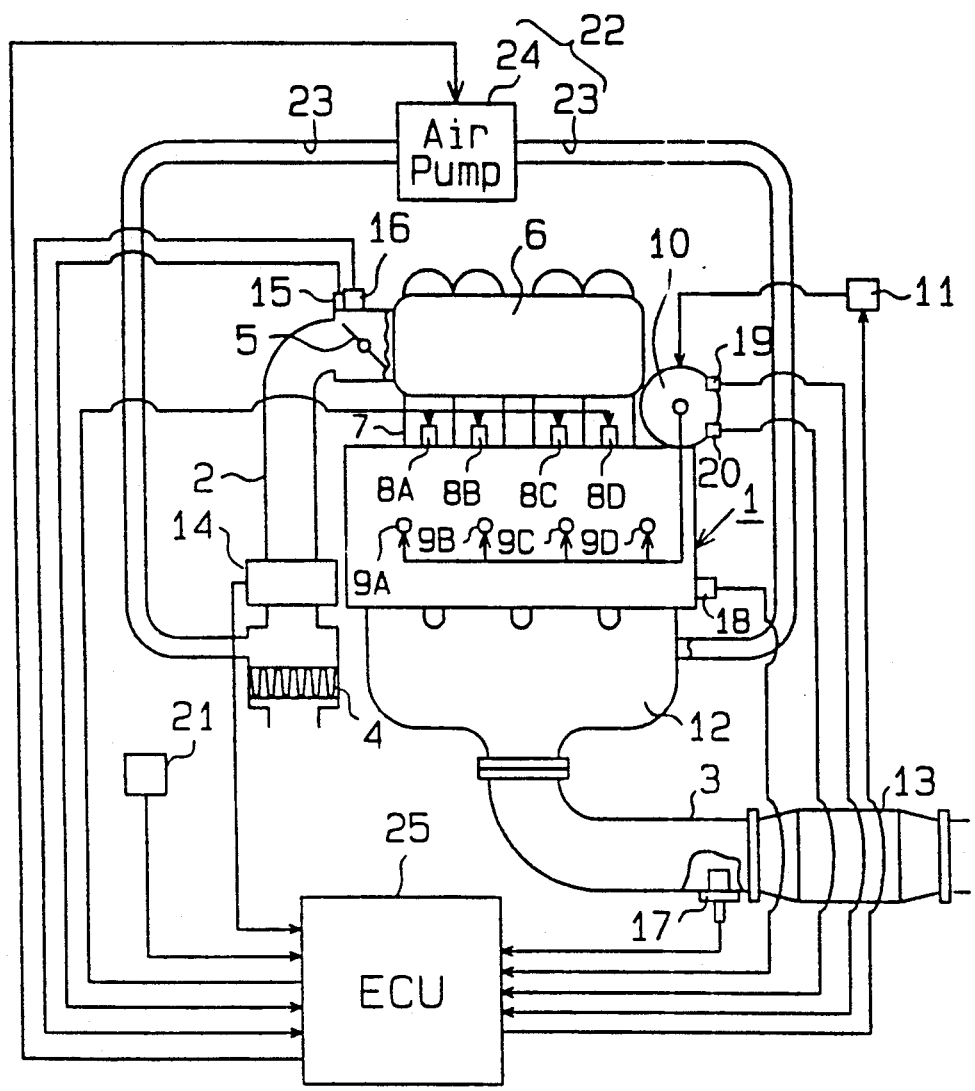

A first and a second embodiments of the present invention will now be described. The first embodiment will be described with respect to basic mechanical and electronic concepts relating to a secondary air supplier, and a diagnostic system therefor, according to the present invention. The second embodiment will be described only in relation to the points of difference with respect to the first embodiment.

First Embodiment

The first preferred embodiment according to the present invention will now be described referring to the drawings FIGS. 1 through 11.

As shown in FIG. 1, an gasoline engine 1 includes four cylinders, and is mounted in a vehicle. Every cylinder bore in the engine 1 has a combustion chamber (not shown). An intake passage 2 and an exhaust passage 3 communicate with those combustion chambers.

The intake passage 2 includes an air cleaner or filter 4, a throttle valve 5, a surge tank 6, and intake manifolds 7, which are disposed along the intake passage 2 in named order, from the upper stream side to the engine cylinder block. Fresh air is introduced to the engine 1, via the above-described parts 4, 5, 6 and 7.

The inclination angle of the throttle valve 5 is controlled in relation to the thrusting angle or force applied on of an accelerator pedal (not shown). The amount of air supplied through the passage 2 is adjusted according to the inclination angle. Further, the tank 6 eliminates the pulsation generated in the air steam flowing through the passage 2, so as to make the air stream flow smoothly.

A plurality of fuel injectors 8A, 8B, 8C and 8D are provided in the manifolds 7, to supply fuel to each one of the corresponding cylinders. Fuel is injected from each one of the injectors 8A through 8D, simultaneously with the air introduced into the passage 2. The air-fuel mixture is supplied to each one of the combustion chambers.

The engine 1 is provided with ignition plug 9A, 9B, 9C and 9D, for igniting the air-fuel mixture supplied to the corresponding combustion chambers. Each ignition plug is activated, based on an ignition signal from a distributor 10. The distributor 10 distributes a high voltage signal, that is from an ignitor 11 to the ignition plugs 9A through 9D, synchronously with a crank angle of the engine 1. The individual ignition plug provides a spark to cause the mixture within the corresponding chamber to burn explosively. The explosive burning generates the engine power. The exhaust gas in the chambers is discharged, via the exhaust passage 3.

The exhaust passage 3 includes an exhaust manifolds 12 and a catalytic converter 13, which are serially disposed along the passage. The catalytic converter 13 purifies the hydro-carbon (HC), carbon monoxide (CO) and nitrogen oxide (NOx) in a exhaust gas, by means of a catalyst contained.

An air flowmeter 14, a valve switch 15, a throttle sensor 16, an oxygen sensor 17, a coolant temperature sensor 18, an engine speed sensor 19, a timing sensor 20, and a vehicle speed sensor 21, are provided for detecting the operating condition of the engine 1. The air flowmeter 14 is disposed downstream from the air cleaner 4, to determine the amount of air (i.e., intake amount Q) which is supplied to the engine 1.

The throttle sensor 16 is disposed in the vicinity of the throttle valve 5, and detects an opening angle (TA) of the throttle valve 5. The valve switch 15 is also disposed in the vicinity of the throttle valve 5. The switch 15 is turned on, when the throttle valve 5 completely closes the passage 2, whereupon, the switch 15 transmits a signal indicative of the complete closure of the passage 2 (hereinafter, the signal will be to refer as "completely closed signal (LL)").

The oxygen sensor 17 is disposed between the exhaust manifolds 12 and the catalytic converter 13. The oxygen sensor 17 detects the residual oxygen density within the exhaust gas. In other words, it detects the air-fuel ratio (A/F) of the exhaust gas within the exhaust passage 3. The oxygen sensor 17 has a special characteristic, namely that the output voltage from the sensor 17 is significantly changed at near the theoretical air-fuel ratio (i.e., "14.5" in this embodiment).

The sensor 17 includes electric elements which are essentially made of zirconia or titania. The sensor 17 is provided with a heater for maintaining the electric elements at a constant temperature. The coolant temperature sensor 18 is provided on a water outlet housing (not shown) which forms an outlet for the coolant. The sensor 18 detects the temperature (THW) of the engine coolant. The engine speed sensor 19 detects the number of revolutions of the engine 1 per unit of time (i.e., engine speed (NE)), based on the number of revolutions of a rotor disposed within the distributor 10.

The timing sensor 21 detects a displacement of the crank angle of the engine 1, by a predetermined interval, in accordance with the rotation of the rotor of the distributor 10. The timing sensor 21 is disposed on a transmission mechanism (not shown) that is operatively connected to the engine 1. The sensor 21 detects the vehicle speed (SPD).

The engine system is provided with a secondary air supplier 22, for feeding air into the exhaust passage 3. The air supplier 22 includes a passage 23 and an electric air pump 24 provided along the passage 23. One end of the passage 23 is connected midway between the air cleaner 4 and the air flowmeter 14. The other end of the passage 23 is connected to the exhaust manifolds 12, between the oxygen sensor 17 and the engine cylinder block.

The electric air pump 24 is driven by an electric motor. The predetermined amount of air discharged by the pump 24 is referred to "secondary air", and is fed to the exhaust manifolds 12. The pump 24 is activated to supply the secondary air, when the engine 1 is operating under specific conditions. Some exemplary specific conditions include: (1) warming-up condition of the engine 1, when the coolant is still cold, i.e. when the coolant temperature (THW) is low; and (2) the engine is decelerating.

The supplied air is utilized to burn the residual gasoline within the exhaust gas, in order to generate heat. Heat causes the catalysts to warm up, resulting in the efficiency of the exhaust purification process.

Figure 2:
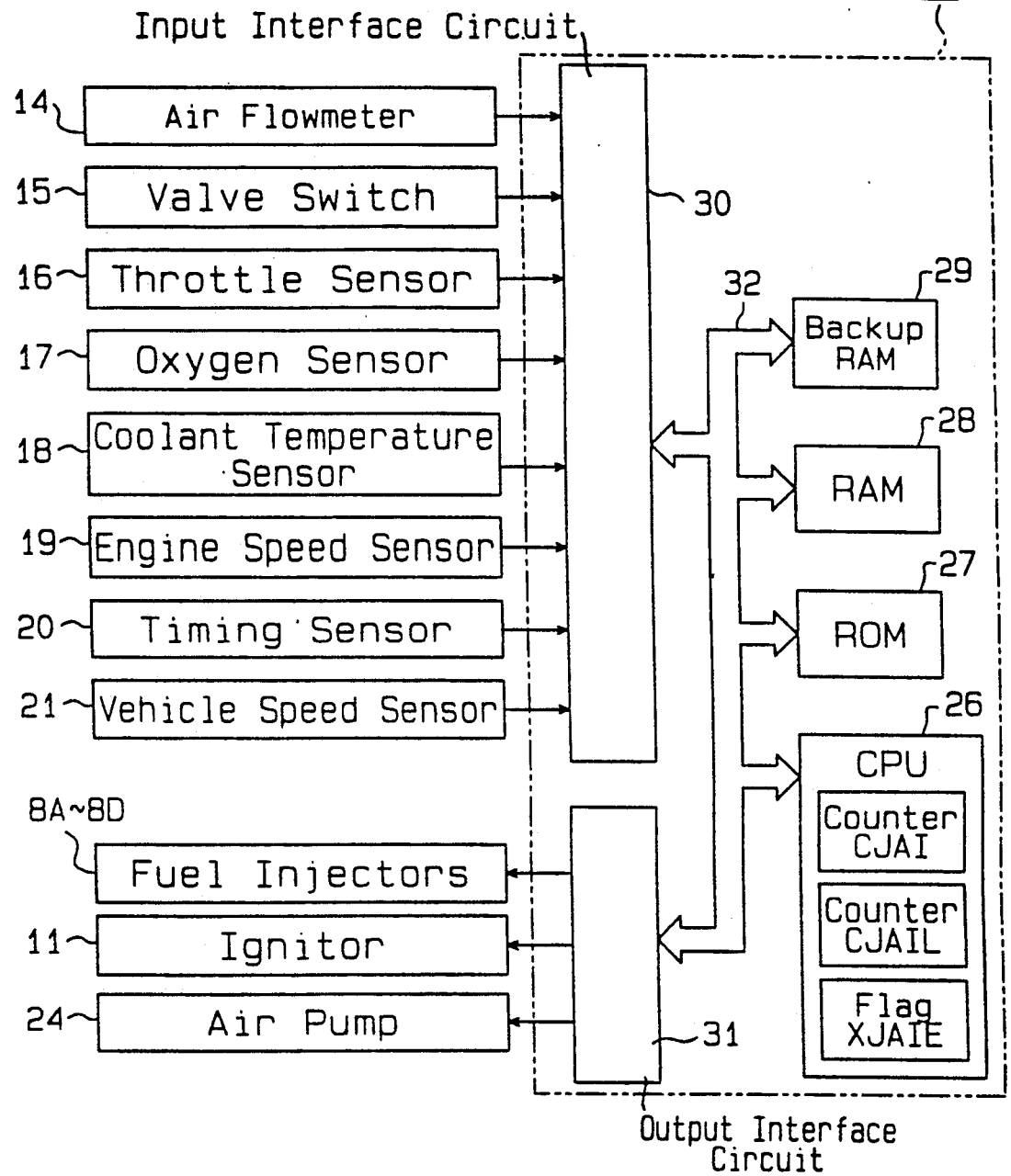

The engine system includes an electric control unit (ECU) 25 for totally controlling the engine 1 and its related devices. As shown in FIG. 2, the ECU 25 includes a central processing unit (CPU) 26, a read only memory (ROM) 27, a random access memory (RAM) 28, a backup RAM 29, an input interface circuit 30, an output interface circuit 31, and buses 32 which mutually interconnect these devices. The CPU 26 executes various operations corresponding to the prepared control programs. The ROM 27 stores the control programs and initial data, which are necessary for the CPU 26 to execute the operations. The RAM 28 temporarily stores a calculated result by the CPU 26. The backup RAM 29 is powered by a battery (not shown), and backs up the various data to be stored, even after the main power is cut off.

The input interface circuit 30 is connected to the air flowmeter 14, the valve switch 15, the throttle sensor 16, the oxygen sensor 17, the coolant temperature sensor 18, the engine speed sensor 19, the timing sensor 20 and the vehicle speed sensor 21. The output interface circuit 31 is connected to the fuel injectors 8A through 8D, the ignitor 11 and the electric air pump 24. The CPU 26 receives the output signals transmitted from the air flowmeter 14, the switch 15 and the sensors 16 through 21, as input data, via the input interface circuit 30. The CPU 26 controls the fuel injectors 8A through 8D, the ignitor 11 and the electric air pump 24, via the output interface circuit 31, based on the input data.

The function of the CPU 26 will not be now explained in more detail. Based on the detected signals from the throttle sensor 16, the temperature sensor 18 and the speed sensor 21, the CPU 26 determines whether or not the engine 1 is in the condition which is required to execute the feedback control of the A/F ratio. If the engine 1 is in such a condition, the CPU 26 receives the signal from the oxygen sensor 17, and determines the A/F ratio.

The CPU 26 controls the amount of fuel injected from the fuel injectors 8A through 8D, such that the A/F ratio becomes close to a predetermined or theoretical air-fuel ratio. The CPU 26 calculates the target value of the fuel injection time period (hereinafter, the target value is referred as "target injection period (TAU)"), based on the following equation (0);

$$TAU = K \cdot (Q/NE) \cdot FAF \qquad (0)$$

where "K" is a constant value, "Q" is the intake amount, "NE" is the engine speed, "K·(Q/NE)" is a standard value of the fuel injection period, on getting the theoretical air-fuel ratio, and "FAF" is a feedback correction factor which varies in accordance with the output signal transmitted from the oxygen sensor 17. The TAU is corrected by the FAF, such that the A/F ratio becomes close to the theoretical air-fuel ratio.

Figure 3:
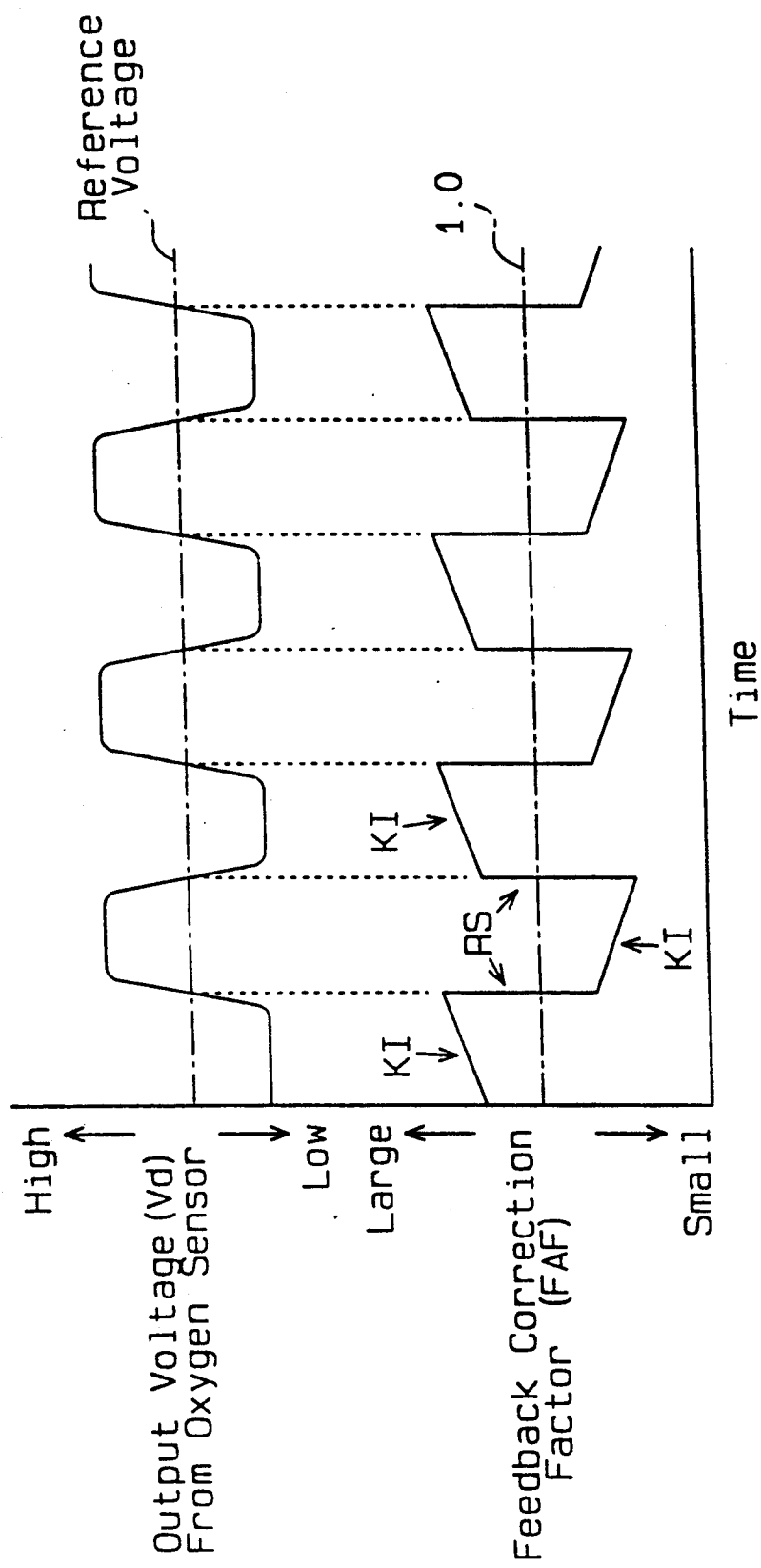

The CPU 26 calculates the feedback correction factor (FAF) as follows: As shown in FIG. 3, the CPU 26 compares the output voltage (Vd) from the oxygen sensor 17, to the reference voltage (Vr), that corresponds to the theoretical air-fuel ratio. If the output voltage (Vd) is higher than the reference voltage (Vr), the CPU 26 determines that the A/F ratio indicates a rich condition, in which the fuel is excessively supplied in comparison with the theoretical air-fuel ratio. If the output voltage (Vd) is lower than the reference voltage (Vd), the CPU 26 determines that the A/F ratio is indicating the lean condition.

When the A/F ratio indicates a rich condition, the CPU 26 compares the present A/F ratio to the previous A/F ratio. Then, the CPU 26 determines whether or not the A/F ratio indicates a change from the lean condition to the rich condition. If the A/F ratio indicates a change to the rich condition, the value of (FAF−RS) is set as a new feedback correction factor (FAF). "RS" is an amount of skipping. When the indication of the A/F ratio is determined to indicate the lean condition, the value of (FAF−KI) is set as the new feedback correction factor (FAF). "KI" is an integral capacity, and the value of RS is extremely larger than that of KI.

When the signal transmitted from the oxygen sensor 17 indicates a lean condition, the CPU 26 compares the current A/F ratio to the previous A/F ratio. Then, the CPU 26 determines whether or not the A/F ratio indicates a change from the rich condition to the lean condition. When the A/F ratio indicates a change to the lean condition, the CPU 26 sets the value of (FAF+RS) as the new feedback correction factor (FAF). When the A/F ratio is determined to indicate the rich condition, the CPU 26 sets the value of (FAF+KI) as the new feedback correction factor (FAF).

Therefore, when the A/F ratio indicates changes between the rich and lean conditions, the CPU 26 varies or skips the feedback correction factor (FAF) at a step rate, in order to regulate the amount of fuel injection. While the air-fuel ratio (A/F) does not indicate a change in the rich or lean condition, the CPU 26 continuously and gradually varies the feedback correction factor (FAF) to correspond to the existing condition. When the A/F ratio is controlled to become the theoretical air-fuel ratio, the feedback correction factor (FAF) is varied such that the average value of FAF is 1.0.

In addition, the CPU 26 calculates a mean value (FAFAV) of the feedback correction factor. For example, every time the indication of the A/F ratio changes between the rich and lean conditions, and when the feedback correction factor is changed by the skipping amount (RS), the CPU 26 calculates the mean value between the feedback correction factor (FAF) just before skipping, and the previous factor (FAF), just before skipping, and sets it as the new FAFAV. The FAFAV can be calculated by taking the mean value of last few feedback correction factors (FAF), just before skipping.

After the CPU 26 calculates the target injection period (TAU) according to equation (0), the CPU 26 outputs signals reflective of the value of the TAU, to the fuel injectors 8A through 8D. These output signals determine the fuel injection period of the individual injector, thus regulating the amount of fuel to be injected. The feedback control is achieved in this manner, so that the A/F ratio approaches the theoretical air-fuel ratio.

Figure 4:
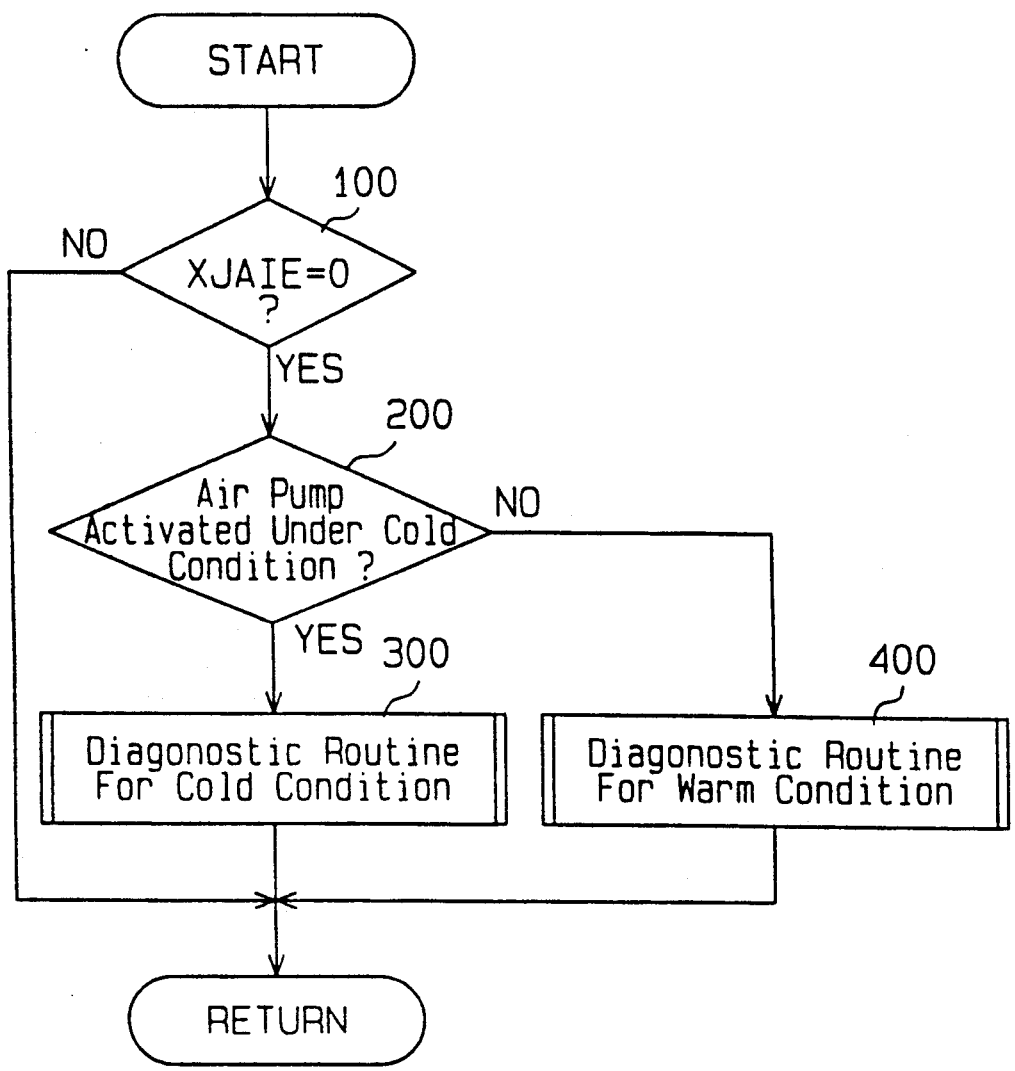

Next, the operations and functions of this embodiment will be now described. The flowchart in FIG. 4 shows the main routine executed by the CPU 26, for the purpose of diagnosing the condition of the secondary air supplier 22. This diagnostic operation following the main routine is performed in response to an interruption request, which is periodically received by the CPU 26 at predetermined time interval (in this embodiment, 0.065 seconds).

A diagnosis flag (XJAIE) is provided for the diagnostic operation. The flag (XJAIE) indicates whether or not the diagnosis of the secondary air supplier 22 is completed. The flag (XJAIE) will be set to "0" by an engine initialize routine which is executed at the time when an ignition switch (not shown) is turned on. Further, the flag (XJAIE) will be set to "1", after the completion of the diagnostic operation.

The coolant temperature (THW) is confirmed, after the engine 1 is activated, by manipulating the ignition switch. When the temperature (THW) is in the range between 10° C. and 35° C., the CPU 26 transmits a signal to activate the electric air pump 24, according to an another control routine, in order to improve the exhaust characteristic of the engine. At the same time, when the pump 24 is activated, the flag (XJAIE) is set to "0", according to above mentioned engine initialize routine. Particularly, in this embodiment, when the temperature (THW) is in the range between the 10° C. and 35° C., the engine 1 is identified as being in the "cold condition". When the temperature (THW) is higher than 35° C., the engine 1 is identified as being in the "warm condition".

Figure 5:
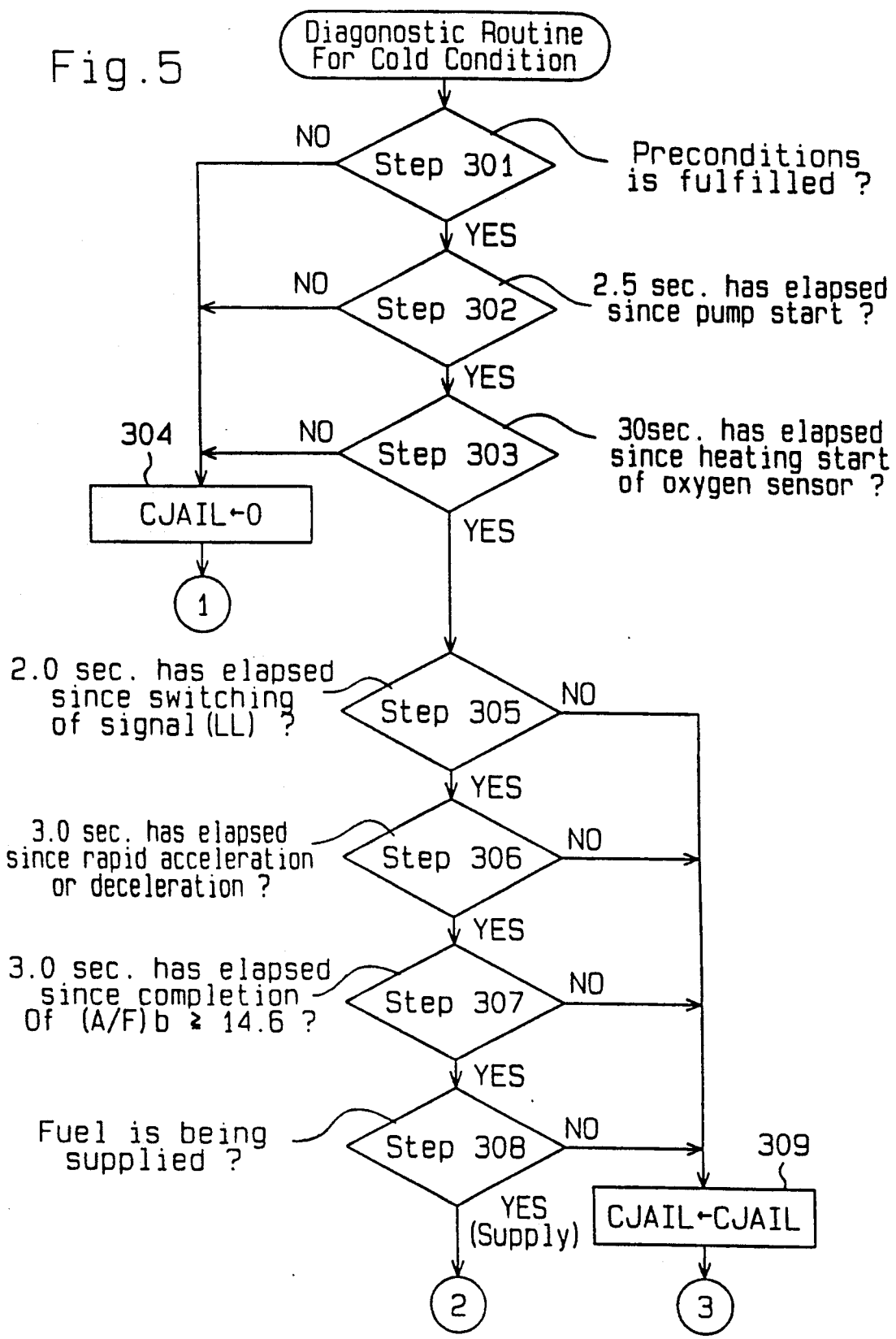

The routine shown in FIG. 4 is started in response to the interrupt request. At first, the CPU 26 determined whether or not the flag (XJAIE) is set to "0" (step 100). At the initial condition, the CPU 26 determines that the flag (XJAIE) is equal to "0". Then, the CPU 26 determines whether or not the air pump 24 is activated, while the engine 1 is in the cold condition (step 200). While the coolant temperature (THW) is in the range between 10° C. and 35° C., the pump 24 is activating. Therefore, the CPU 26 determines that the pump 24 is activated at step 200, and advances to execute a diagnostic routine for the cold condition, as shown in Figs. 5 and 6 (step 300).

The CPU 26 determines whether or not the secondary air supplier 22 is functioning properly, according to the diagnostic routine. When the CPU 26 determines that the supplier 22 is functioning properly, the CPU 26 sets the flag (XJAIE) to "1", and terminates the main routine.

When the CPU 26 sets the flag (XJAIE) to "1" at step 300, the CPU 26 will determine that the determination at step 100 in the next determination cycle is "NO". At this time, the CPU 26 does not execute any operation, and terminates the main routine.

Figure 9:
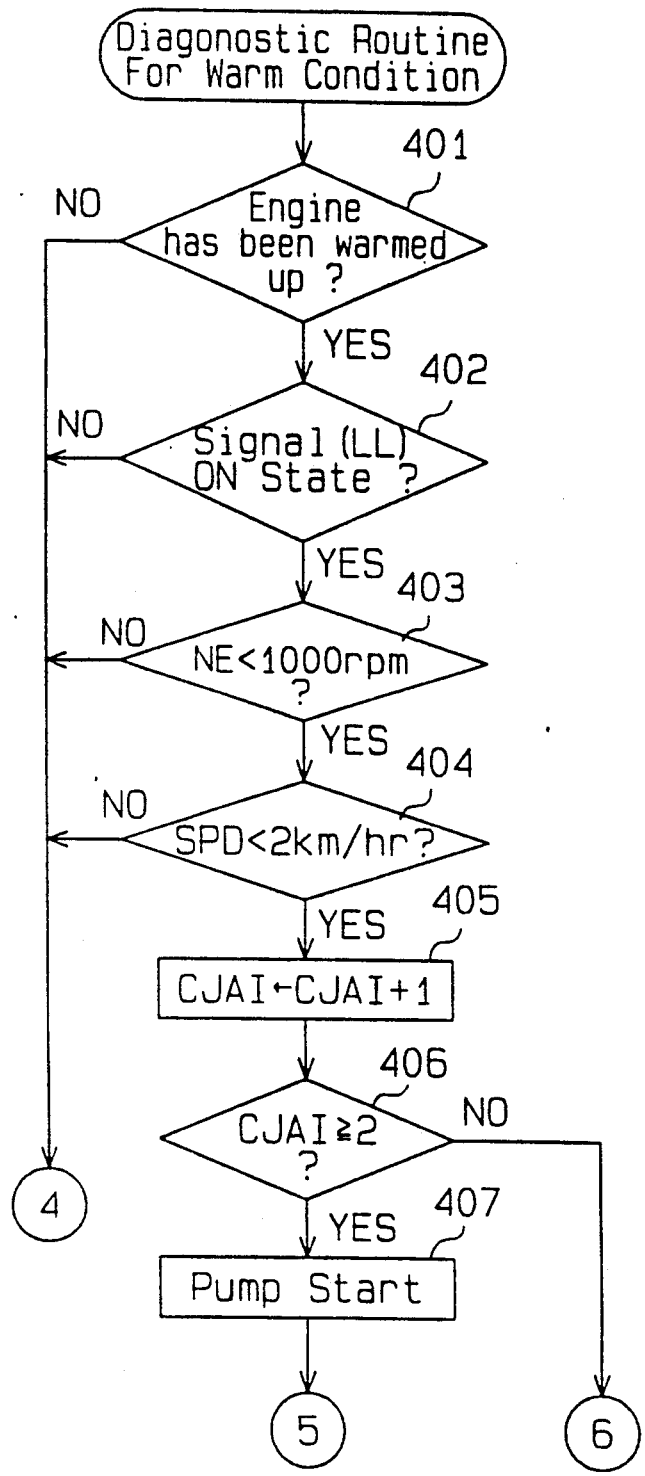
Figure 10:
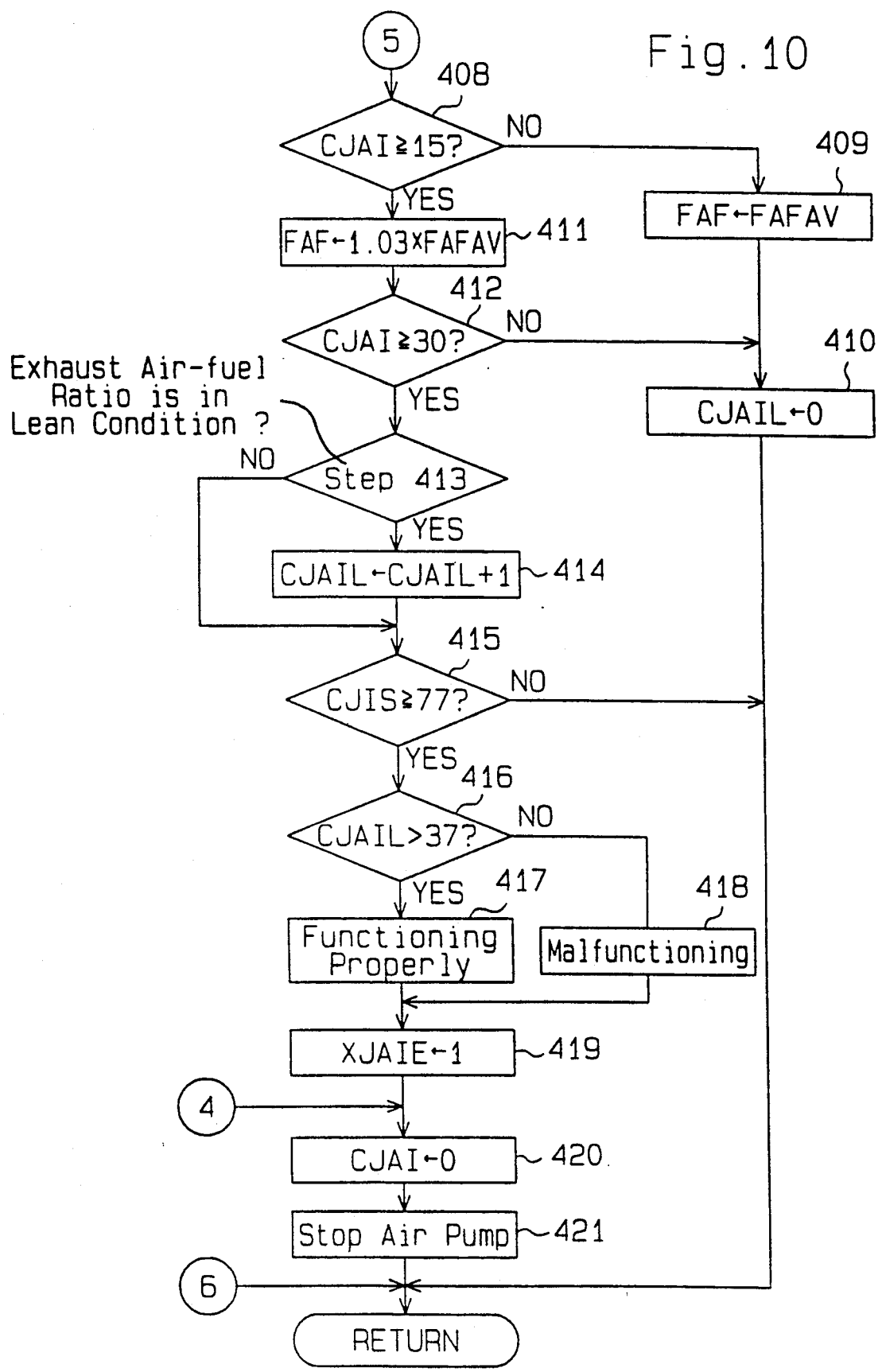

When the CPU 26 determines that the secondary air supplier 22 is not functioning properly, according to the routine at step 300, and when the coolant temperature (THW) exceeds 35° C., then the electric air pump 24 is deactivated. Therefore, the CPU 26 determines that the pump 24 is deactivated at step 200, and advances to step 400, which includes a diagnostic routine for the warm condition, as shown in FIGS. 9 and 10. The CPU 26 determines whether or not the supplier 22 is functioning properly, according to the routine at step 400. Then, the CPU 26 sets the flag (XJAIE) to "1", and terminates the main routine.

Accordingly, in this embodiment, it is determined whether or not the secondary air supplier 22 is functioning properly, by first executing the diagnostic routine for the cold condition. If the result of determination indicates that the supplier 22 is in the "not proper" condition, the CPU 26 detects whether the supplier 22 is functioning properly, according to the diagnostic routine for the warm condition.

The diagnostic routine for the cold condition will now be described in detail, referring to the flow charts shown in FIGS. 5 and 6.

The CPU 26 shifts its operation from the step 200 shown in FIG. 4 to the routine shown in FIG. 5, and determines whether or not the preconditions needed for executing diagnostic operation during the cold condition are fulfilled (step 301). One such precondition is that the air supplier 22 should not be determined to be in an abnormal condition, via another malfunctioning diagnostic routine which differs from the present routine for cold condition. The other precondition is that the diagnostic routine has the functions of detecting an accidental fire, and of diagnosing the conditions of the devices, such as the fuel supply system, the oxygen sensor 17, and the coolant temperature sensor 18.

The CPU 26 determines whether or not a first predetermined period of time (e.g., 2.5 seconds) has elapsed since the beginning of the activation of the pump (step 302). Further, the CPU 26 determines whether or not a second predetermined period of time (e.g., 30 seconds) has elapsed since the heating of the oxygen sensor 17 has started (step 303).

If any of the conditions of steps 301 through 303 is not fulfilled, the CPU 26 sets a counting value for a lean period counter (CJAIL) to "0" (step 304), and terminates the routine. The lean period counter (CJAIL) is one of the internal accumulators of the CPU 26, and measures the time period for the lean condition. The value of the lean period counter (CJAIL) indicates an accumulated value of time interval, when the air-fuel ratio (A/F)b in the exhaust gas mixed with the secondary air indicates a lean condition, during the diagnosis of the supplier 22. Hereinafter, the ratio (A/F)b will be simply referred to as "exhaust air-fuel ratio (A/F)b". The value of the lean period counter (CJAIL) changes within the range of the minimum value corresponding to $-8.3$ seconds, and the maximum value corresponding to 8.3 seconds.

When all the conditions of steps 301 through 303 are satisfied, the CPU 26 determines that the engine 1 is in a suitable condition for the diagnostic operation for the cold condition. Then, the CPU 26 executes steps 305 through 308, in order to determine whether or not the exhaust air-fuel ratio (A/F)b indicate a temporary rich condition, in response to the change in the engine condition while the secondary air is being supplied.

The CPU 26 determines whether or not two seconds has elapsed, after the state of the signal (LL) has changed (step 305). There are two conditions to cause the signal (LL) to change. One is when the signal (LL) is switched from the ON state to the OFF state. The other is when the signal (LL) is switched from the OFF state to the ON state. The following reasons are for the CPU 26 to execute the determination at step 305.

When the signal (LL) is switched from the ON state to the OFF state, simultaneous fuel injection to the cylinders will be executed. As a result, the air-fuel ratio (A/F)a of the air-fuel mixture within the combustion chambers temporarily becomes in the rich condition. Hereinafter, the ratio (A/F)a will be referred to as the "base air-fuel ratio". The signal (LL) is switched from the OFF state to the ON state, when the vehicle starts decelerating, and the throttle valve 5 is closed. At this time, pressure in the intake passage 2 decreases. The fuel adhered on the internal wall surface of the intake passage 2 until this time evaporates instantly, and this fuel vapor is fed into the corresponding chambers. Therefore, the base air-fuel ratio (A/F)a becomes significantly in the rich condition.

Thus, when the completely closed signal (LL) is switched either from the ON state to the OFF state, or from the OFF state to the ON state, the exhaust air-fuel ratio (A/F)b has become in the rich condition. The CPU 26 requests the two seconds elapse after the signal (LL) has changed, in order to neglect the temporary condition in which the (A/F)b becomes rich, in response to the change of the signal (LL).

The CPU 26 determines whether or not a third predetermined time (e.g., three seconds) has elapsed since the rapid acceleration or deceleration occurred (step 306). The determination operation for the above-described rapid acceleration or deceleration will be executed in the following way. The CPU 26 calculates an absolute value of the deviation between the current engine speed detected in the present detection cycle and the engine speed detected during the previous detection cycle, based on the detection signal by the engine speed sensor 19. Further, the CPU 26 compares this absolute value to a predetermined deviation (e.g., 34.4 rpm).

When the absolute value of this deviation exceeds the predetermined deviation, the CPU 26 determines that rapid acceleration or deceleration has been taken place.

The CPU 26 determines whether or not a fourth predetermined time (e.g., three seconds) has elapsed since the exhaust air-fuel ratio (A/F) b exceeded "14.6" (step 307). The exhaust air-fuel ratio (A/F)b is calculated by following equations (1) through (7a).

Equation (1) is for calculating the air-fuel ratio (A/F) when the engine is in the warm engine.

$$A/F = (QA)/(FUL) \approx 14.5 \qquad (1)$$

$$FUL = (QA)/14.5 \qquad (2)$$

"QA" is an amount of air fed into the combustion chamber. "FUL" is an amount of fuel.

The equation (3) is for calculating the amount of fuel (FULa) when the engine is in the cold condition.

$$FULa = FUL \cdot (1 + FWL) \qquad (3)$$

"FWL" in equation (3) is a correction factor which is used to increase the fuel amount when the coolant temperature is low, when FWL=0 during the warm condition, and FWL>0 during the cold condition.

Equation (4) is for calculating the exhaust air-fuel ratio (A/F)b when the air pump 24 is activated.

$$\begin{aligned}(A/F)b &= (QA + QEAP)/FULa \\ &= (QA + QEAP)/\{FUL \cdot (1 + FWL)\}\end{aligned} \qquad (4)$$

Where "QEAP" in the equation (4) is a discharge amount from the pump 24.

The next equation (5) must be satisfied, in order to maintain the exhaust air-fuel ratio (A/F)b. The lean condition is indicated by a large value, i.e. greater than 14.5 (theoretical air-fuel ratio).

$$14.5 < (QA + QEAP)/\{FUL \cdot (1 + FWL)\} \quad (5)$$

Equation (6) is obtained by substituting equation (2) into equation (5), and rearranging.

$$QA \cdot (1 + FWL) < QA + QEAP$$

$$QA \cdot FWL < QEAP \quad (6)$$

Equation (6) is the approximate expression which is used to accurately maintain the exhaust air-fuel ratio (A/F)b at greater value than the theoretical air-fuel ratio, even when the amount of fuel is increased. When the conditions of equation (7) are satisfied, the exhaust air-fuel ratio (A/F)b indicates a rich condition.

$$QA \cdot FWL \geq QEAP \quad (7)$$

$$QA \cdot FWL/QEAP \geq 1 \quad (7a)$$

Whether or not the exhaust air-fuel ratio (A/F)b indicates a lean condition, can be determined by equations (7) or (7a).

Next, the CPU 26 determines whether or not the fuel is being supplied (step 308). This determination is executed, based on the flag condition which is set according to another routine different from the diagnostic routine for the cold condition.

When all the conditions of steps 305 through 308 are satisfied, the CPU 26 advances its execution to step 310 as shown in FIG. 6. In other words, the CPU 26 determines that the exhaust ratio (A/F)b does not indicate a rich condition, due to the change in the operating condition of the engine 1, when the following four conditions are satisfied: (1) at least two seconds have elapsed since the signal (LL) has changed; (2) at least three seconds have elapsed since the rapid acceleration or deceleration occurred; (3) at least three seconds having elapsed since the equation (7) or (7a) is satisfied; and (4) the fuel is kept supplying.

The CPU 26 determines whether or not the exhaust ratio (A/F)b indicates a lean condition, based on the output voltage from the oxygen sensor 17 (step 310). At this time, if the secondary air supplier 22 is functioning properly, the exhaust ratio (A/F)b should indicate a lean condition. Therefore, when the CPU 26 determines that the exhaust ratio (A/F)b indicates a lean condition, the CPU 26 increments the lean period counter (CJAIL) by "1" (step 311). If however, the CPU 26 determines that the exhaust ratio (A/F)b indicates a rich condition, some malfunction of the pump 24 or a clog along the passage 23 could cause the amount of discharged air to be decreased. In this condition, the CPU 26 decrements the value in the counter (CJAIL) by "1" (step 312).

Thereafter, the CPU 26 determines whether or not the value in the counter (CJAIL) is at least "77" (step 313). The counting value of "77" corresponds to a predetermined time period of "five seconds". When the value in the CJAIL is at least "77", the CPU 26 determines that the secondary air supplier 22 is functioning properly (step 314). The CPU 26 sets the flag (XJAIE) to "1" (step 315), and terminates the routine. On the other hand, when the value in the CJAIL is less than "77" at step 313, the CPU 26 immediately terminates the routine.

If all of the conditions of steps 305 through 308 are not satisfied, the base air-fuel ratio (A/F)a is temporarily richer in the condition than the theoretical air-fuel ratio. At this time, if the CPU 26 executes the diagnostic operation, based on the output signal indicative of the rich condition, from the oxygen sensor 17, the result of this diagnosis could be erroneous. Therefore, the CPU 26 retains the value of the lean period counter (CJAIL), which was set in the previous determination cycle (step 309).

When all of the conditions of steps 305 through 308 are satisfied, the CPU 26 can restart to execute the counting operation for the counter CJAIL.

The timing chart in FIG. 7 indicates the changes in the output signal of the oxygen sensor 17, and in the value of the counter (CJAIL), when the state of the signal (LL) has changed. When the secondary air supplier 22 is functioning properly, the exhaust ratio (A/F)b indicates a lean condition, due to the secondary air supply, during the ON state of the signal (LL) (i.e., before timing t1). Therefore, the value of the counter (CJAIL) is incremented to measure the lean period.

When the signal (LL) is switched to the OFF state in the timing t1, simultaneous fuel injection is executed. Therefore, the base air-fuel ratio (A/F)a is to become in an extremely rich condition. At this time, even if a normal amount of secondary air is supplied under this condition, the exhaust air-fuel ratio (A/F)b does not become in the lean condition. The output signal transmitted from the oxygen sensor 17 is changed from the lean condition signal to the rich condition signal.

As indicated by a two-dotted chain line in FIG. 7, if the value of the lean period counter (CJAIL) were deceased synchronously with the change in the signal transmitted from the oxygen sensor 17, the CPU 26 could not make correct determinations, regardless of proper operation of the secondary air supplier 22. However, according to the present embodiment, the counting operation by the counter (CJAIL) is interrupted, and the value in the counter is maintained.

At t2, the counting operation of the counter (CJAIL) is resumed. When the value in the counter (CJAIL) becomes at least "77" at t3, the CPU 26 determines that the supplier 22 is functioning properly.

The timing chart of FIG. 8 illustrates changes in the output signals transmitted from the oxygen sensor 17, and changes in the value of the counter (CJAIL), when the calculated exhaust ratio (A/F)b becomes more than 14.6. If the secondary air supplier 22 is functioning properly, the calculated ratio (A/F)b indicates a lean condition, while the equation (7a) is not satisfied (i.e., before timing t4). Therefore, the value of the lean period counter (CJAIL) is incremented.

As the equation (7a) is satisfied at t4, the base air-fuel ratio (A/F)a becomes extremely rich. Even if a normal amount of secondary air is supplied under this condition, the exhaust air-fuel ratio (A/F)b does not become in the lean condition. At this time, the output signal transmitted from the oxygen sensor 17 is changed from the lean signal to the rich signal. As indicated by a two-dotted chain line in FIG. 8, if the lean period counter (CJAIL) were decreased simultaneously with the change in the signal transmitted from the oxygen sensor 17, the CPU 26 could not make correct determinations, regardless of proper operation of the secondary air supplier 22. However, according to the present embodiment, the counting operation by the lean period counter CJAIL is interrupted, and the value in the counter is maintained.

At t5, the counting operation of the counter (CJAIL) is resumed. When the value in the counter (CJAIL) becomes at least "77" at t6, the CPU 26 determines that the air supplier 22 is functioning properly. In this way, the operations of steps 305 through 308 will enable the CPU 26 to detect the engine condition in which the air-fuel ratio (A/F) indicates the rich condition, regardless of the secondary air supply.

It could be proposed that the decrement operation by the counter (CJAIL), at the time when the output signal from the sensor 17 indicates the rich condition, can be eliminated from the diagnostic routine for the cold condition. However, when the decrement operation is eliminated, the output signal from the sensor 17 will be alternately and continuously switched between the lean condition signal and the rich condition. As a result, the value in the counter (CJAIL) will eventually become "77", and the CPU 26 will make an incorrect determination that the supplier 22 is functioning properly. Such an incorrect determination should be prevented. Therefore, according to the present embodiment, the value in the lean period counter (CJAIL) is decreased, when the output signal from the oxygen sensor 17 indicates the rich condition.

A diagnostic routine for the warm condition will be now described below in detail, referring to the flowcharts of FIGS. 9 and 10, and the timing chart of FIG. 11.

Figure 11:
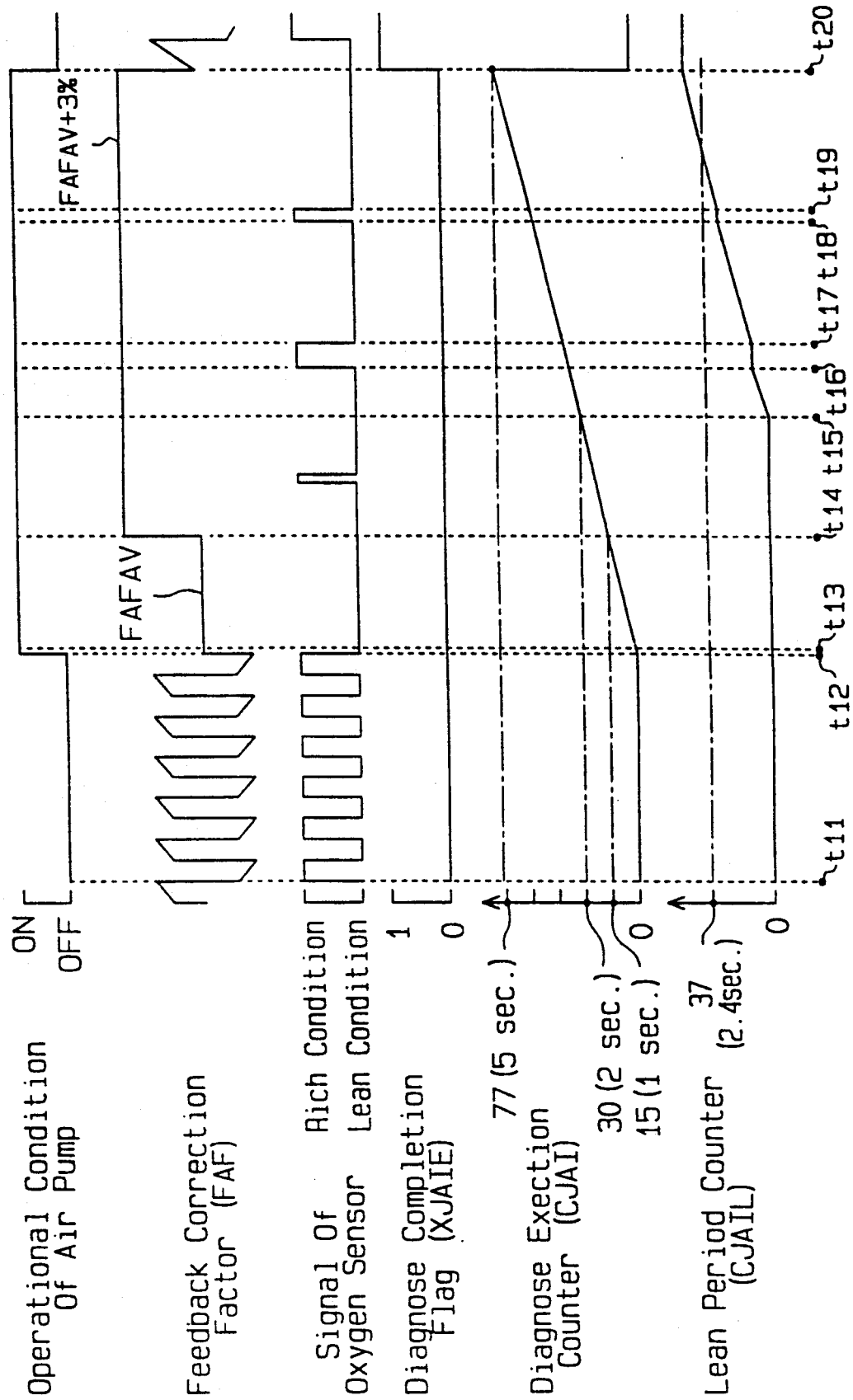

The CPU 26 starts executing the operations according to the diagnostic routine at t11 (FIG. 11). At first, the CPU 26 determines whether or not the coolant temperature (THW) is within a predetermined range (80° C.≦THW<100° C.). In other words, the CPU 26 determines whether or not the engine 1 has warmed-up (step 401). Then, the CPU 26 determines whether or not the signal (LL) from the completely closed switch 15 is in the ON state (step 402). The CPU 26 determines whether or not the engine speed (NE) is less than a predetermined revolution number (e.g. 1000 rpm) (step 403). Furthermore, the CPU 26 determines whether or not the vehicle speed (SPD) detected by the vehicle speed sensor 21 is less than a predetermined value (e.g. 2 km/hr) (step 404).

When all the conditions of steps 401 through 404 are not satisfied, the CPU 26 sets a value in a diagnosis execution counter (CJAI) to as "0" (step 420 in FIG. 10). The diagnosis execution counter (CJAI) is one of internal accumulators of the CPU 26. The counter (CJAIL) measures the time length from the start until the end of the diagnostic operation, in order to control the operational timing of the secondary air supplier 22, during the diagnostic period, and the timing of changing the feedback correction factor (FAF). The CPU 26 then outputs a signal to stop the operation of the air pump 24 (step 421), and terminates the routine. By stopping the pump operation, the secondary air will no longer be fed into the exhaust manifolds 12. Then, the feedback control operation of air-fuel ratio (A/F) is started, utilizing the feedback correction factor (FAF).

When all of the determination conditions of steps 401 through 404 of FIG. 9 are satisfied (i.e., at t12, FIG. 11), the CPU 26 determines that the engine is in condition for the diagnosis during the warm condition, and starts executing the diagnosis operation at step 405.

The CPU 26 increases the value in the diagnosis execution counter (CJAI) by "1" (step 405). The switching time for the counter (CJAI), to switch its state from "0" to "1", is approximately 0.065 seconds. The CPU 26 then determines whether or not the value in the counter CJAI is at least "2" (step 406). In other words, the CPU 26 determines whether or not 0.13 seconds has already elapsed since the beginning of the counting operation by the counter (CJAI). At.t12, the value in the counter (CJAI) is equal to "1", and the determination condition of step 406 is not satisfied. Then, the CPU 26 does not execute any operation, and terminates the routine.

One reason for terminating the routine when the value in the counter (CJAI) is less than "2" will be given hereafter. As 0.065 seconds has not elapsed yet since the engine became diagnosable, the value in the counter (CLAI) is unidentifiable, i.e. whether it is "0" or "1". Hence, when it is certain that the value in the counter (CJAI) has become greater than "1", in other words, when the counter (CJAI) has performed the counting operation at least twice, the CPU 26 advances to the next step.

When the condition at step 406 is satisfied (i.e., at t13, FIG. 11), the CPU 26 transmits a signal, in order to activate the electric air pump 24 (step 407). The pump 24 sends the secondary air to the exhaust manifolds 12.

The CPU 26 determines whether or not the value in the counter (CJAI) is at least "15" (step 408). In other words, the CPU 26 determines whether or not approximately one second has elapsed since the secondary air supply has started. At t13, the value in the counter (CJAI) is "2", and the condition at step 408 is not satisfied. Then, the CPU 26 advances its execution to step 409.

The CPU 26 sets the feedback correction factor (FAF) to a mean value, or an average value (FAFAV) of the feedback correction factors, in order to terminate the feedback control of the air-fuel ratio (A/F), utilizing the old factor (FAF) (step 409). The CPU 26 re-sets the value in the lean period counter (CJAIL) to "0" (step 410), and terminates this routine.

As the above described operations are repeatedly executed, the value in the counter (CJAI) is increased by "1" at step 405. The condition at step 408 (i.e., CJAI≧15) is satisfied at t14 (FIG. 11), and the CPU 26 advances to step 411. The CPU 26 increases the mean value (FAFAV) by a predetermined ratio (in this embodiment, 3%), and sets this increased value as a new feedback correction factor (FAF) (step 411). The operation at step 411 causes the base air-fuel ratio (A/F)a to be forcibly rich.

The CPU 26 determines whether or not the value in the counter (CJAI) is at least "30" (step 412). In other words, the CPU 26 determines whether or not approximately two seconds have elapsed since the secondary air supply has started. At 14, the value in the counter (CJAI) is "15", and the condition of step 412 is not satisfied. Then, the CPU 26 sets the value in the lean period counter (CJAIL) to "0" (step 410), and terminates this routine.

The above-described operations are repeatedly executed, and the condition at step 412 (i.e., CJAI≧30) is satisfied at t15 (FIG. 11). Then, the CPU 26 determines whether or not the exhaust air-fuel ratio (A/F)b indicates a lean condition (step 413). When the exhaust air-fuel ratio (A/F)b indicates a lean condition at t15, the CPU 26 increases the value in the lean period counter (CJAIL) by "1" (step 414). It takes 0.065 seconds for the counter (CJAIL) to change its state from "0" to "1".

The CPU 26 determines whether or not the value in the diagnosis execution counter (CJAI) is at least "77" (step 415). In other words, the CPU 26 determines whether or not approximately five seconds has elapsed since the counter (CJAI) has started counting. It takes five seconds to complete the diagnostic operations. At t15, the value in the counter (CJAI) is "30", and the determination condition of step 415 is not satisfied. Then, the CPU 26 immediately terminates this routine.

As long as the exhaust air-fuel ratio (A/F)b indicates a lean condition, the value in the counter (CJAIL) is increased by "1", at step 414. When the exhaust air-fuel ratio (A/F)b indicates a rich condition at t16 (FIG. 11), the determination condition of step 413 is no longer satisfied. Then, the CPU 26 keeps the value of the counter (CJAIL) in the previous cycle, and begins to execute the operation starting at step 415.

When the exhaust ratio (A/F)b again indicates a lean condition at t17 (FIG. 11), the counting operation for the lean period counter (CJAIL) is resumed. Further, the value of the counter (CJAIL) at t16 is increased by "1" (step 414). When the exhaust ratio (A/F)b indicates a change to the rich condition from the lean condition, at t18 (FIG. 11), the CPU 26 keeps the value of the counter (CJAIL) in the previous cycle, and begins to execute the operation starting at step 415. Further, the exhaust ratio (A/F)b again indicates a lean condition at t19 of FIG. 11. Then, the CPU 26 executes the operation of step 414, and reactivates the counter (CJAIL) to resume counting.

As described above, the operations of steps 413 and 414 are repeatedly executed, until the determination condition (i.e., CJAI≧77) of step 415 is satisfied. At step 414, the entire lean condition period of time is accumulated, and the accumulated period is indicated as the value of the counter (CJAIL).

When step 415 is satisfied at t20 (FIG. 11), the CPU 26 determines the operational condition of the secondary air supplier 22, in reference to the value of the counter (CJAIL). At first, the CPU 26 determines whether or not the value of the counter (CJAIL) is greater than "37" (step 416). The value of "37" corresponds to "2.4 seconds". When the value of the counter (CJAIL) is greater than "37", the CPU 26 determines that the secondary air supplier 22 is functioning properly (step 417). On the other hand, when the value of the counter (CJAIL) is at most "37", the CPU 26 determines that the secondary air supplier 22 is malfunctioning (step 418).

The reasons for setting the determination condition as "37" (2.4 seconds) will now be described. The exhaust air-fuel ratio (A/F)b could temporarily indicate a rich condition, when the secondary air supplier 22 is functioning properly, and when the secondary air is supplied to the exhaust passage during a certain period of time. Even if the ratio (A/F)b indicates temporarily in the rich condition, the period of the rich condition is extremely short. Therefore, the ratio (A/F)b should indicate a lean condition, for the time period longer than the time period corresponding to a predetermined ratio (80 percent, in this embodiment) with respect to a minimum period of time for the secondary air supply.

According to this embodiment, the minimum period of time for the secondary air supply is set to approximately three seconds (i.e., from two seconds to five seconds since the air supplier 22 is activated). 2.4 seconds is equal to 80 percent of the minimum period. Accordingly, the CPU 26 determines whether or not the total lean condition period within the present minimum period of three seconds, is longer than 2.4 seconds. The result of this determination indicates the operational condition of the secondary air supplier 22.

After completing the determination of step 417 or 418, the CPU 26 sets the flag (XJAIE) to "1" (step 419). The CPU 26 then sets the value of the counter (CJAI) to "0" (step 420). Further, the CPU 26 terminates the operation of the air pump 24, to prevent the secondary air from being fed to the exhaust manifolds 12 (step 421). Thereafter, the CPU 26 terminates this routine.

According to this embodiment, the oxygen sensor 17 detects the air-fuel ratio (A/F). If the engine 1 is operating at a certain predetermined condition, the amount of fuel injected by the fuel injectors 8A through 8D is controlled, such that the air-fuel ratio (A/F) approaches the theoretical air-fuel ratio (i.e., 14.5). Otherwise, the secondary air is supplied to the exhaust manifolds 12 disposed at the upper stream position of the oxygen sensor 17. The time period of the lean condition, while the secondary air is supplied, is measured by the lean period counter (CJAIL) (steps 311 and 312). When the lean period exceeds the predetermined length (five seconds, in this embodiment), the CPU 26 determines that the supplier 22 is functioning properly (steps 313 and 314).

Further, when the exhaust air-fuel ratio (A/F)b indicates a rich condition, while the secondary air is supplied, the lean period counter (CJAIL) is temporarily interrupts its counting operation, and keeps the counted value during the interruption (steps 303 through 309). After a predetermined period of time has elapsed, the counter (CJAIL) is reactivated to resume its counting operation. Therefore, the operational condition of the supplier 22 is precisely detected, even if the exhaust air-fuel ratio (A/F)b temporarily indicates a rich condition in response to the change of the engine condition, while the secondary air is supplied.

According to this embodiment, the secondary air is supplied to the exhaust manifolds 12 during the predetermined period of time (step 408), and the period of the lean condition in the air-fuel ratio A/F is measured by the lean period counter (CJAIL) (steps 413 and 414). When the ratio of the lean period to the secondary air supply period is less than, or equal to the predetermined ratio (i.e., 80 percent), the CPU 26 determines that the secondary air supplier 22 is malfunctioning (steps 416 and 418). Accordingly, the CPU 26 can precisely detect the operational condition of the supplier 22, in any of the following conditions:

(1) air-fuel ratio (A/F) indicates a slightly rich condition, for example A/F=14.5;
(2) air-fuel ratio (A/F) in each cylinder significantly differs from one another;
(3) temperature of the oxygen sensor elements is lowered; and
(4) temporary change in the ratio (A/F) causes the output from the oxygen sensor 17 to fluctuate.

The diagnostic system according to this embodiment can precisely detect the operational condition of the secondary air supplier 22, regardless of the temporary fluctuation in the air-fuel ratio (A/F). The diagnostic system differs from the conventional system which performs the diagnostic operation for detecting malfunctioning, depending on the signal output from the oxygen sensor.

Second Embodiment

Figure 12:
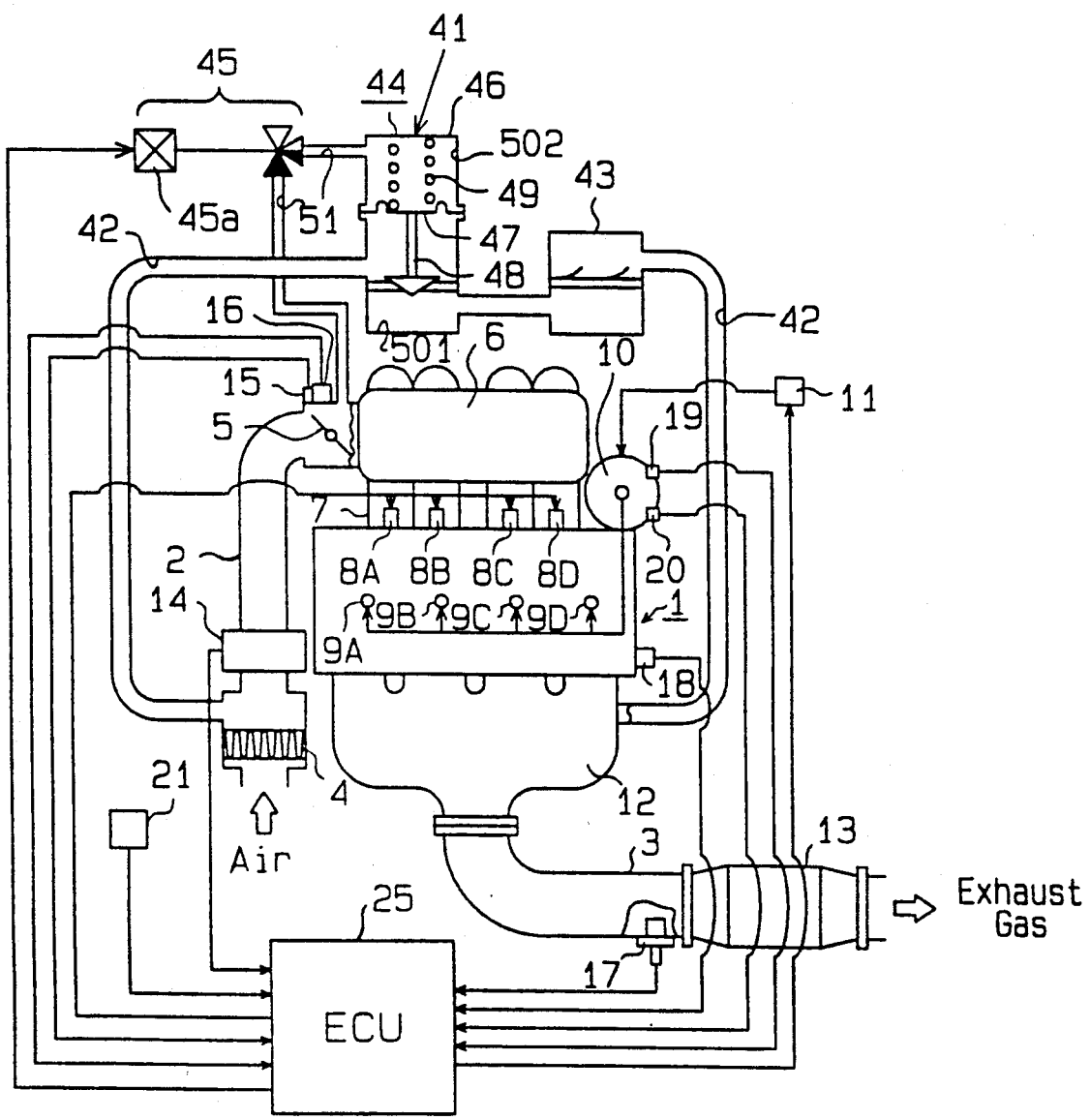
FIG. 12 is a schematic plan view illustrating a gasoline engine system, including the secondary air supplier according to a second embodiment of the present invention.

The second embodiment of a diagnostic system according to the present invention will be now described, referring to FIG. 12. The basic concept of the system in the second embodiment is similar to that of the first embodiment. Therefore, the second embodiment will be described with particular emphasis on the difference with respect to the first embodiment.

In the second embodiment, the secondary air supplier 22 of the first embodiment is replaced by a secondary air supplier 41 shown in FIG. 12. The elements are similar to those in the first embodiment, and are given similar reference numerals, and the explanation of these elements is partly omitted.

The secondary air supplier 41 is an air suction type supplier which utilizes exhaust gas pulsation within the exhaust passage 3, in order to directly intake air from the intake passage 2. The supplier 41 includes a passage or path 42, a check valve 43, an air switching valve 44 (hereinafter, referred to as "ASV 44"), and a vacuum switching valve 45 (hereinafter, referred to as "VSV 45"). One end of the passage 42 is connected midway between the air cleaner 4 and the air flowmeter 14. The other end of the passage 42 is connected to the exhaust manifolds 12, between the oxygen sensor 17 and the engine cylinder block. The intake passage 2 and the exhaust passage 3 communicate with each other, via the passage 42. Accordingly, part of the air in the intake passage 2 is fed into the exhaust manifolds 12, as the secondary air, via the passage 42. The check valve 43 prevents the air from flowing towards the intake passage 2 from the exhaust passage 3.

The ASV 44 includes a casing 46 and a diaphragm 47 stretched across the internal portion of the casing 46. The diaphragm 47 defines the casing 47 into two internal chambers, a first chamber 501 and a second chamber 502. The ASV 44 further includes a movable valve piece 48 which is connected to the diaphragm 47 within the first chamber 501, and a coil spring 49 which is disposed within the second chamber 502. The valve piece 48 opens and closes the passage 42. The spring 49 urges the valve piece 48 in the downward direction in Fig. 12, for causing the valve piece 48 to close the passage 42.

The second chamber 502 communicates with the intake passage 2, via a lead passage 51 branched away between the throttle valve 5 and the surge tank 6. When the internal pressure of the second chamber 502 decreases, the valve piece 48 permits the passage 42 to be opened. The VSV 45 is disposed midway along the lead passage 51, and controls the internal pressure of the second chamber 502.

The VSV 45 includes a solenoid 45a which is controlled by the ECU 25. When the solenoid 45a is excited in response to the signal transmitted from the ECU 25, the lead passage 51 is opened, causing to communicate between the second chamber 502 and the intake passage 2. Consequently, the internal pressure of the second chamber 502 decreases by the suction to the intake manifolds. As a result, the diaphragm 47 is bent upwardly against the biassing force of the spring 49, so that the valve piece 48 is shifted from a position where it closes the passage 42, to a position where it permits the secondary air to flow along the passage 42. Consequently, the air in the intake passage 2 is supplied to the exhaust manifolds 12.

On the other hand, when the solenoid 45a is no longer energized, the VSV 45 cuts off the communication between the second chamber 502 and the intake passage 2, and also lets the second chamber 502 communicate with the atmospheric air. At this time, the valve piece 48 is returned to the position where the spring 49 causes to close the passage 42. Supplying the secondary air to the exhaust manifolds 12 is prevented. In the second embodiment, the output interface circuit 31 of the ECU 25 is connected to the VSV 45, instead of the electric air pump 24 of the first embodiment. The CPU 26 inputs signals output from the air flowmeter 14, the completely closed switch 15 and sensors 16 through 21, via the input interface circuit 30. The CPU 26 controls the fuel injectors 8A through 8D, an ignitor 11 and the VSV 45, via the output interface circuit 31. Therefore, the operations and advantages of this system according to the second embodiment are fundamentally similar to those of the system described in the first embodiment. The VSV 45 substitutes all the operations by the electric air pump 24 at steps 200, 302, 407, 421 etc.

Although only two embodiments of the present invention have been described herein, it should be apparent to those skilled in the art that the present invention may be embodied in many other specific forms, without departing from the spirit or scope of the invention. Particularly, it should be understood that following modification may be applied.

For example, the system in the second embodiment can be designed to execute only the diagnostic routine for the warm condition, without executing the diagnostic routine for the cold condition.

Although the first and the second embodiments relate to the engine having four cylinders, the number of cylinders is not an essential factor of the present invention.

A vehicle having the diagnostic system according to the present invention can be provided with a warning light disposed in the instrument panel of the vehicle. The warning light warns a driver against the abnormal conditions of the secondary air supplier.

Therefore, the present examples and embodiments are to be considered as illustrative and not restrictive, and the invention is not to be limited to the details giving herein, but may be modified within the scope of the appended claims.

What is claimed is:

1. A diagnostic system for a secondary air supplier in an engine, the engine including an intake passage and an exhaust passage, the secondary air supplier including an air supply unit for supplying secondary air from the intake passage to the exhaust passage, for mixing with existing exhaust gas, and for changing an air-fuel ratio of the exhaust gas; a detection unit for detecting a condition of the engine; and a control unit for controlling the air supply unit in accordance with the engine condition, the diagnostic system comprising:

command means for instructing the secondary air supplier to supply air to the exhaust passage for a predetermined period of time;

first detection means for detecting the air-fuel ratio (A/F) of the exhaust gas within the exhaust passage;

second detection means for detecting whether said air-fuel ratio indicates a lean condition of the exhaust gas;

measuring means for measuring a lean period, during which said second detection means continuously detects said lean condition, while the secondary air supplier supplies air in response to an instruction from said command means;

diagnostic means for determining the condition of the secondary air supplier, said diagnostic means determining that the air supplier is malfunctioning, when a ratio of said lean period to said predetermined period of time is smaller than a predetermined ratio.

2. The diagnostic system according to claim 1, wherein said predetermined ratio is about 80 percent.

3. The diagnostic system according to claim 1, wherein said predetermined period of time is around three seconds.

4. The diagnostic system according to claim 1, for use when the engine is in a warm condition.

5. The diagnostic system according to claim 1, whereby the diagnosis of the secondary air supplier is performed in the condition where air-fuel ratio should be a rich condition.

6. The diagnostic system according to claim 1, wherein the secondary air supplier includes:

a passage for connecting the intake passage and the exhaust passage; and an air pump provided along said passage.

7. The diagnostic system according to claim 1, wherein the secondary air supplier includes:

a passage for connecting the intake passage and the exhaust passage;

switch means provided along said passage, for switching between a first position, where air is allowed to flow along said passage, and a second position, where air is prohibited from flowing along said passage; and valve means for controlling said switch means.

8. A method for diagnosing a secondary air supplier in an engine, the engine including an intake passage and an exhaust passage, the secondary air supplier including a air supply unit for supplying secondary air from the intake passage to the exhaust passage, for mixing with existing exhaust gas, and for changing an air-fuel ratio of the exhaust gas; a detection unit for detecting the condition of the engine; and a control unit for controlling the air supply unit in accordance with the engine condition, the method comprising the steps of:

A. determining whether the engine is in a predetermined condition suitable for diagnosing the secondary air supplier;

B. instructing the secondary air supplier to supply air to the exhaust passage for a predetermined period of time;

C. calculating an air-fuel ratio (A/F) of the exhaust gas within the exhaust passage;

D. comparing said calculated air-fuel ratio to a theoretical air-fuel ratio, in order to determine whether said calculated air-fuel ratio indicates a lean condition;

E. measuring a lean period, during which said lean condition is continuously detected, while the secondary air supplier supplies air in response to said instruction step;

F. calculating a ratio of said measured lean period to said predetermined period of time;

G. comparing said calculated ratio to a predetermined ratio;

H. determining that the secondary air supplier is malfunctioning, when said calculated ratio is smaller than said predetermined ratio.

9. The method according to claim 8, wherein said predetermined ratio is about 80 percent.

10. The method according to claim 8, wherein said predetermined period of time is around three seconds.

11. The method according to claim 8, for use when the engine is in a warm condition.

12. The method according to claim 8, whereby the diagnosis of the secondary air supplier is performed in the condition where air-fuel ratio should be a rich condition.

13. A diagnostic system for a secondary air supplier in an engine, the engine including an intake passage and an exhaust passage, the secondary air supplier including an air supply unit for supplying secondary air from the intake passage to the exhaust passage, for mixing with existing exhaust gas, and for changing an air-fuel ratio of the exhaust gas; a detection unit for detecting a condition of the engine; a control unit for controlling the air supply unit in accordance with the engine condition; and the secondary air being supplied to the exhaust passage when the engine is in a predetermined condition, the diagnostic system comprising:

first detection means for detecting the air-fuel ratio (A/F) of the exhaust gas within the exhaust passage;

second detection means for detecting a lean condition of the air-fuel ratio, while the secondary air supplier supplies air to the exhaust passage;

third detection means for detecting a temporary rich condition, in which the air-fuel ratio indicates a rich condition, regardless of the air supply by the secondary air supplier;

measuring means for measuring a lean period, during which said second detection means continuously detects said lean condition;

regulation means for regulating said measuring means, and for stopping the measurement of said lean period by said measuring means during said temporary rich condition, so as to keep a measured value of said lean period during said temporary rich condition, and said regulation means resuming the measurement of said lean period, after the completion of said temporary rich condition; and diagnostic means for determining the condition of the secondary air supplier, said diagnostic means determining that the secondary air supplier is functioning properly, when the total measured lean period exceeds a predetermined value.

14. The diagnostic system according to claim 13, wherein said predetermined value is around five seconds.

15. The diagnostic system according to claim 13, for use when the engine is in a cold condition.

16. The diagnostic system according to claim 13, wherein the secondary air supplier includes:

a passage for connecting the intake passage and the exhaust passage; and an air pump provided along said passage.

17. The diagnostic system according to claim 13, wherein the secondary air supplier includes:

a passage for connecting the intake passage and the exhaust passage;

switch means provided along said passage, for switching between a first position, where air is allowed to flow along said passage, and a second position, where air is prohibited from flowing along said passage; and valve means for controlling said switch means.

* * * * *